United States Patent [19]
Slack

[11] 3,822,899
[45] July 9, 1974

[54] BOAT TRAILER
[76] Inventor: Ramon Allan Slack, 10 Breadalbane St., Toronto 5, Ontario, Canada
[22] Filed: June 26, 1972
[21] Appl. No.: 266,419

[52] U.S. Cl............................. 280/414 R, 214/505
[51] Int. Cl............................................. B60p 3/10
[58] Field of Search........... 280/414 R; 214/505, 84; 9/1 TR

[56] References Cited
UNITED STATES PATENTS

| | | | |
|---|---|---|---|
| 2,196,338 | 4/1940 | McDaniel | 280/80 B X |
| 2,727,758 | 12/1955 | Smith | 280/34 A |
| 2,797,008 | 6/1957 | Banker | 214/505 |
| 2,838,192 | 6/1958 | Dzvonik | 280/34 A X |
| 2,856,087 | 10/1958 | Steber | 214/505 X |
| 2,938,642 | 5/1960 | Felix | 214/505 |
| 3,138,271 | 6/1964 | DeLay | 214/84 X |
| 3,140,003 | 7/1964 | Horner | 214/505 |
| 3,160,297 | 12/1964 | Stumroll | 214/84 |
| 3,167,198 | 1/1965 | Echler et al. | 214/505 |
| 3,178,043 | 4/1965 | Easterwood | 214/84 |

Primary Examiner—Leo Friaglia
Attorney, Agent, or Firm—Fetherstonhaugh & Co.

[57] ABSTRACT

A boat trailer which is adjustable in length to facilitate launching when extended and trailing when contracted. The trailer consists of a boat supporting carriage member which is slidably mounted on a towing frame. The boat carriage preferably has a pair of longitudinally extending tubular sleeve members and the towing frame includes at least two longitudinally extending beam members which are slidably mounted in the sleeve members of the carriage.

16 Claims, 3 Drawing Figures

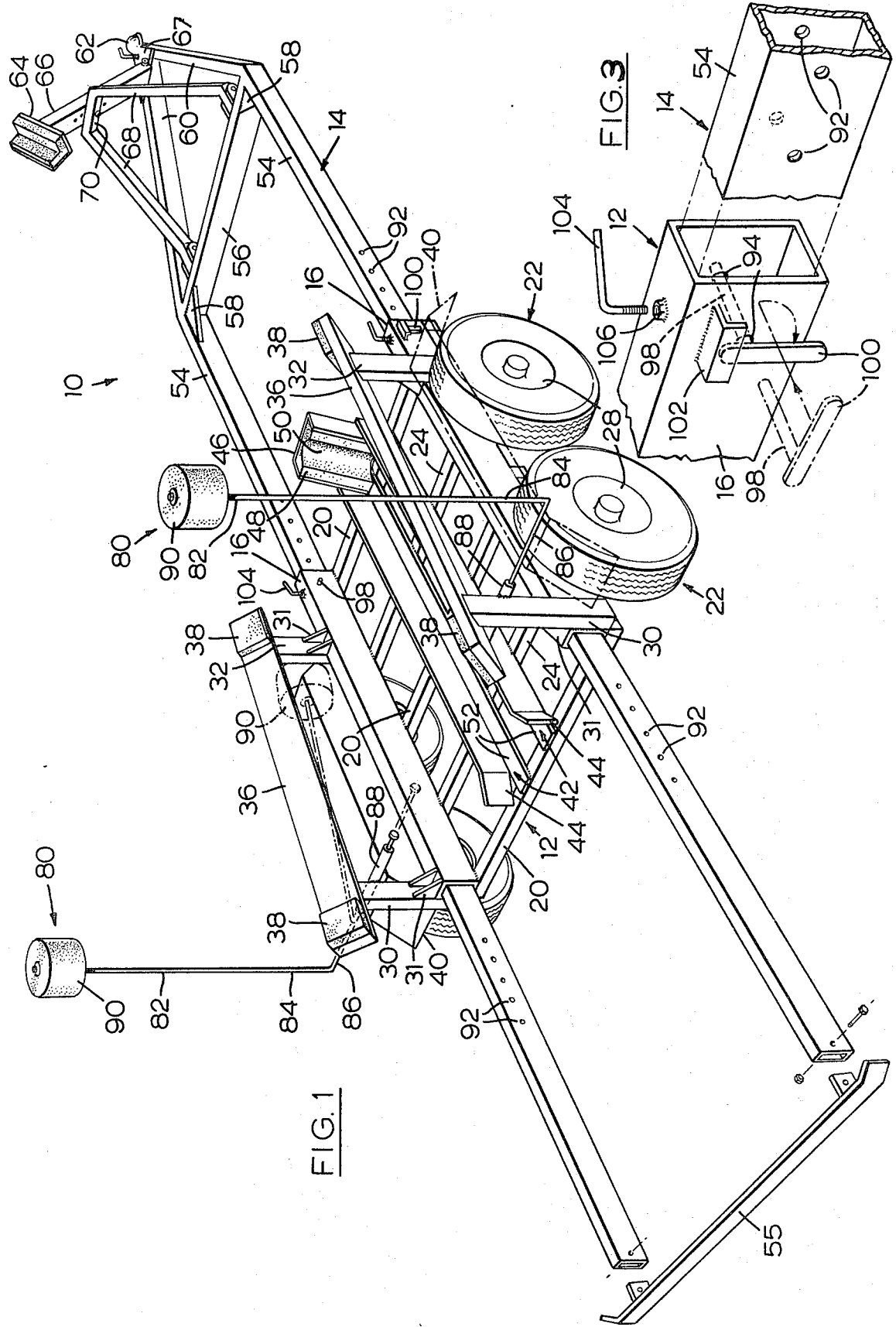

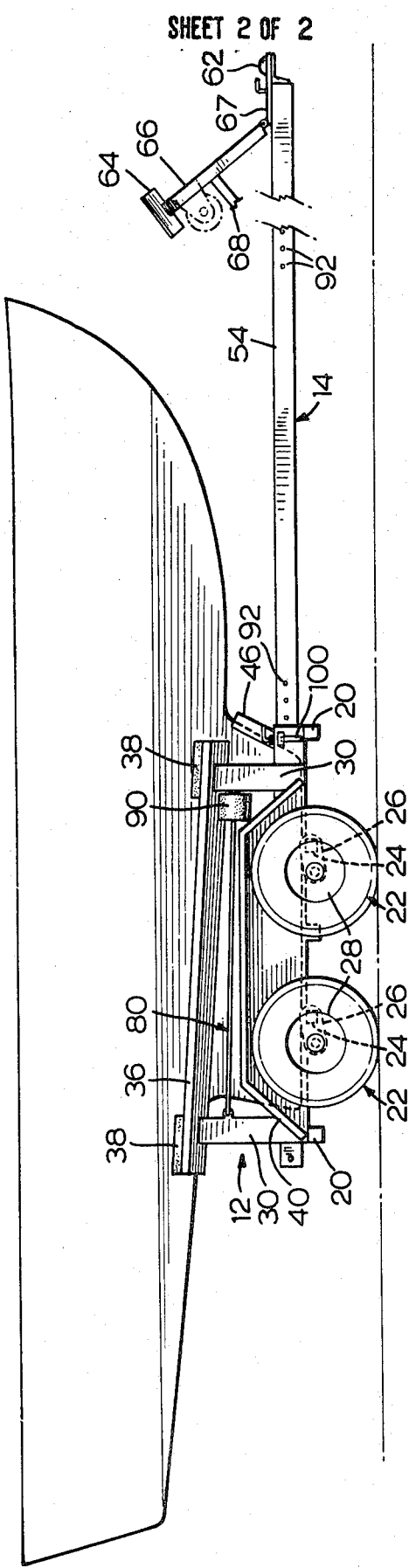

BOAT TRAILER

FIELD OF INVENTION

This invention relates to boat trailers. In particular this invention relates to an adjustable boat trailer suitable for use in towing, launching and loading of relatively large draft boats.

PRIOR ART

Considerable difficulty is experienced when using conventional boat trailers to launch boats having a draft in excess of about ten inches. Launching difficulties are experienced due to the fact that, to locate a trailer in a depth of water sufficient to float a boat having a draft of up to thirty inches, the portion of the trailer which supports the boat must be submerged a substantial distance from the shore-line. Using an automobile for positioning a trailer in a loading and unloading submerged position with respect to a body of water would require either an exceptionally steep launching ramp or an exceptionally long trailer using conventional practice. If a trailer was made a sufficient length to enable it to be used for launching a deep draft boat, it would be extremely unstable when used for towing a boat on a highway. In most jurisdictions the length of a trailer which may be towed behind an automobile is limited by law and a trailer of a length sufficient to permit the launching of deep draft boats would be very likely to exceed that permitted by law.

Whereas trailer frames have been provided which include an adjustable support bar on which the socket of a ball socket coupling is mounted so as to provide a minor adjustment in the position of the ball socket with respect to the remainder of the support frame, the extent of adjustment has not been in excess of one or two feet. An adjustment of this amount is provided in order to compensate for differences in the length of boats and the amount of forward overhang of a boat so as to ensure that the boat is spaced a sufficient distance from the towing vehicle when towed on the highway. This type of adjustment is of no significance in improving the ability of the trailer to launch boats of a substantial draft.

SUMMARY OF INVENTION

The present invention overcomes the difficulties of the prior art described above by providing a simple and inexpensive boat trailer which is adjustable in length so as to be of a relatively short length for towing on a highway and of a substantially greater length for use in the launching and loading of boats of a substantial draft.

According to an embodiment of the present invention, a boat trailer comprises a boat supporting carrier member having road engaging wheel means mounted for rotation thereon, and a towing frame having means at one end thereof for connecting the frame to a towing vehicle, the frame being slidably mounted with respect to the carriage for movement between a first retracted towing position and a second extended loading or unloading position, and means for retaining the frame and carriage in either of said positions.

According to a further embodiment of the invention, the length of the trailer may be increased in an amount in excess of 10 feet when moving from said first position to said second position.

According to a still further embodiment of the invention, the boat supporting carriage includes a pair of longitudinally extending tubular frame members and the towing frame means includes a pair of longitudinally extending spaced parallel beam members which are slidably mounted in said tubular members of said boat supporting carriage whereby said towing frame acts as a guide for guiding said boat supporting carriage between said first and second positions.

PREFERRED EMBODIMENT

The invention will be more clearly understood after reference to the following detailed specification read in conjunction with the drawings wherein:

FIG. 1 is a pictorial view illustrating a boat trailer according to an embodiment of the present invention with the carriage member in a first position for towing;

FIG. 2 is a side view of a trailer in an extended position; and

FIG. 3 is an enlarged detailed view of the locking means used for locking the carriage relative to the frame.

With reference to the drawings, the reference numeral 10 refers generally to a boat trailer according to an embodiment of the present invention. The trailer includes a boat supporting carriage member generally identified by the reference numeral 12 and a towing frame assembly generally identified by the reference numeral 14.

The carriage member 12 consists of a pair of longitudinally extending tubular sleeve members 16 supported in a spaced parallel relationship by a plurality of transversely extending support bars 20. Two wheel sets 22, each including a transversely extending support axle 24, a pair of link arms 26 and a pair of wheels 28 are mounted at longitudinally spaced intervals on the longitudinally extending tubular members 16. Each of the wheels 28 is mounted for rotation on a support shaft extending outwardly from the link arms 26. The link arms 26 are pivotable relative to the shafts 24 so as to provide a resilient suspension for each wheel member.

The cradle which supports the boat is mounted on the carriage frame described above and may be in the form of any of the well known cradles presently in use. For simplicity of illustration, a simple cradle structure consisting of a first pair of vertical support pillars 30 and a second pair of vertical support pillars 32 are mounted on the longitudinally extending tubular members 16 and extend outwardly therefrom. The upper ends of the support pillars 32 are connected by angularly inclined beam members 36 which have support pads 38 at either end thereof adapted to bear against the underside of the hull of a boat in use. The vertical support pillars 30 and 32 are braced with respect to the longitudinally extending tubular frame members 16 by gusset plates 31. A wheel fender 40 is positioned to extend over each pair of wheels 28 and may be supported by suitable brackets (not shown) extending downwardly from the support beams 36. A keel support and guide assembly is located centrally of the width of the frame of the carriage and consists of a pair of guide plates 42 arranged in a spaced parallel relationship and extending longitudinally of the carriage frame. An outwardly directed flange 44 is formed at the rear end of each of the guide plates 42 so as to facilitate the entry of the keel of a boat therebetween in use. A U-shaped bracket 46 is mounted in the forward end of the keel guide plates 42 and extends transversely therebetween. A resilient keel support pad 48 is mounted in the bracket 46 and is provided with a contoured surface 50 adapted to receive the leading edge of a keel of a boat in use. Flanges 52 of guide plates 42 extend longitudinally between the guide plates 42 and are connected to the transverse support beams 20 so as to provide a base for supporting a keel of a boat in use. As previously indicated, the structure of the boat cradle is not an essential feature of the present invention and any one of the known cradle assembles adaptable for use on the carriage of the present invention may conveniently be used.

The towing frame 12 consists of a pair of longitudinally extending beam members 54 which are adapted to fit in a close fitting sliding relationship within the tubular members 16 of the carriage. A removable transverse beam 55 is located at the rear end of beam members 54 to support suitable tail lights or the like. A transverse beam 56 is located at the forward end of the longitudinally extending beam members 54 and is rigidly secured thereto and braced by gussets 58. A pair of angularly inclined members 60 projects forwardly from the longitudinally extending portions 54 of the frame and are provided with a socket 62 at the outer end thereof adapted to receive a conventional ball shaped hitch member. A supplementary boat support bracket 64 is mounted on an arm 66 which is pivotally mounted on a support plate 67 located at the forward end of the angularly inclined suport members 60. A brace member consisting of a pair of angularly inclined bars 68 and a transversely inclined bar 70 is hingedly mounted on the transverse support bar 56. The support bracket 64 may be retained in an elevated position by means of the support strut assembly as shown in FIG. 1 of the drawings or it may be lowered to a suitable storage position substantially level with the towing frame as required in use. A winch may also be mounted adjacent the front end of the frame for use in hauling a boat into a storage position on the trailer. The winch may be located in any well known manner.

A pair of location markers 80 each consisting of a post 82 which has a vertically extending portion 84 and a transversely extending portion 86 are mounted in transversely extending sleeve members 88 and are pivotal between a horizontal storage position and a vertical guiding position as shown in FIG. 1 of the drawings. A flotation head 90 made from a material such as polystyrene foam or the like is secured adjacent the outer end of the arm 84. It will be noted that in the stored position, the arm 84 is in the position underlying the area which would be occupied by a boat in use. To move the markers from the stored position to the elevated position, they are first moved transversely outwardly by sliding them outwardly within the sleeves 88 and thereafter pivoted upwardly to the vertical position in which the heads 90 are spaced apart from one another a sufficient distance to permit the boat to move therebetween in passing onto the trailer in use.

In order to lock the carriage 12 with respect to the towing frame 14, a plurality of transversely extending passages 92 are formed in the longitudinally extending frame members 54 and transverse passages 94 are formed in the longitudinally extending sleeve members 16. As shown in FIG. 3 of the drawings, the sleeve members 16 and beam member 54 are secured relative to one another by means of pins 98 which have weighted handles 100 at the other end thereof which project laterally from opposite sides of the outer end of the pin 98. The handles 100 are retained against outward movement by means of a small angle bracket 102 which has a sufficient length to extend downwardly over the upwardly projecting portion of the handle 100 when the pin is in an operative position. To remove the pin it is only necessary to rotate the handle through 90° to provide clearance for the handle with respect to the angle bracket 102 to permit the pin 98 to be withdrawn. The sleeve 16 and the tubular member 54 are also locked by means of a clamping pin 104 which is threadably mounted in a nut 106 which is secured to the tubular member 16 in axial alignment with the passage formed therein whereby the clamping screw 104 may be tightened into clamping engagement with the frame member 54 to rigidly secure one relative to the other.

When the trailer is to be towed on the highway or the like, the carriage portion 12 is located substantially centrally of the length of the towing frame 14 and clamped in this position by means of the clamping pins 104 and locking pins 98 as previously described. When the carriage portion 12 is substantially centrally located with respect to the towing frame 14, the overall length of the trailer with a boat mounted thereon is at a minimum so as to facilitate towing.

In order to facilitate the launching of a boat, the clamping pins and locking pins are released and the towing frame is moved longitudinally relative to the carriage portion 12 and located in the position shown in broken lines in FIG. 2 of the drawings, in which it will be noted that the length of the assembly is then greater than the length of the towing frame and includes a major portion of the length of the carriage portion by reason of the fact that the towing frame is withdrawn from a major portion of the tubular members of the carriage portion. It has been found that with this type of construction, the relative movement of the socket 62 with respect to the boat carriage may be in excess of ten feet so that the rear end of a twenty foot boat mounted on the carriage would be up to 30 feet removed from a socket when the trailer frame is in the extended position shown in FIG. 2 of the drawings. In order to permit the towing frame to be located in the extended position, the transverse brace member 55 is detached. When the trailer is in the extended position shown in FIG. 2, it is arranged for unloading of the boat and may be lowered down a launching ramp and it will be noted that the distance from the trailer hitch to the boat facilitates launching due to the fact that it enables the trailer portion to be located a substantial distance from the waters edge without requiring the towing vehicle to enter the water. When the trailer is in the launching position, the boat may be floated off the carriage portion.

When the boat is to be located on the trailer for removal from the water, the markers 80 are located in the upwardly extended position and the carriage portion is submerged with the trailer in the extended position as described above with respect to the launching of the boat. The boat is then manoeuvered into position between the markers so that it is located in the required position with respect to the cradle. The trailer is then removed from the water by towing and thereafter the length of the trailer is adjusted to the required shortened towing configuration, the brace 55 is secured and the trailer is prepared for use on the highway by applying any additional strapping which may be necessary for rigidly anchoring the boat with respect to the trailer.

It has been found that boats having a draft of about 30 inches and measuring about 23 feet in overall length can conveniently be towed and launched on a trailer of the present invention wherein the total extent of movement of the carriage with respect to the towing frame amounts to ten and a half feet so that in the extended configuration, the combined length of the boat and trailer amounts to a total of about 33½ feet.

Various modifications of the present invention will be apparent to those skilled in the art without departing from the scope of the invention. For example, whereas the use of two longitudinally extending beam members and two longitudinally extending sleeve members adds considerable stability to the trailer as a whole, it is possible that the adjustment of the carriage relative to the towing frame could be achieved by forming the towing frame to include only one longitudinally extending member slidably mounted relative to the carriage.

In a further modification, the towing frame may be constructed so that it includes a number of longitudinally extending telescopically mounted frame members. It should be noted, however, that the preferred construction described above with reference to the drawings is believed to have substantial advantages over a telescopically arranged towing frame in that the strength of a telescopically mounted frame would be restricted to the strength of the smallest member of the telescoping group of members and the overall weight of such a frame would be considerably greater than that of the present invention. Furthermore, to increase the number of sliding components in the frame increases the risk of jamming resulting from misalignment and minor damage in use.

From the aforegoing it will be apparent that the present invention provides a simple and inexpensive boat trailer which is readily adjustable in length to facilitate launching of a boat and to facilitate towing of the boat behind a vehicle on the highway.

What I claim as my invention is:

1. A boat trailer comprising
   a. a boat supporting carriage member having road engaging wheel means mounted for rotation thereon,
   b. a towing frame having means at one end thereof for connecting said frame to a towing vehicle,
   c. said frame being slidably mounted with respect to said carriage for movement between a first retracted towing position and a second extended position for loading and unloading, and
   d. means for retaining said frame and carriage in either of said positions, said carriage member is located substantially centrally of the length of said frame when in said first position such that the frame extends both forwardly and rearwardly of the carriage member for a distance at least equal to the longitudinal length of the carriage member.

2. A boat trailer as claimed in claim 1 wherein said means for connecting said frame to said towing vehicle is disposed at least twice as far as from said carriage member when in said second position as it is when in said first position.

3. A boat trailer as claimed in claim 1 wherein said means for connecting said frame to said towing vehicle is disposed at least three times as far from said carriage member when in said second position as it is when in said first position.

4. A boat trailer as claimed in claim 1 wherein said frame is adjustable relative to said carriage to move said connecting means from ten to thirty feet when moving from said first position to said second position.

5. A boat trailer as claimed in claim 1 wherein said towing frame includes at least two longitudinally extending beam members, and said carriage member includes at least two longitudinally extending tubular sleeve members, said beam members being slidably mounted in said sleeve members.

6. A boat trailer comprising,
   a. a boat supporting carriage member including
      i. longitudinally extending tubular frame means,
      ii. means mounted on said carriage member for supporting said boat to be towed, and
      iii. wheel means for supporting the carriage member for movement during towing,
   b. towing frame means including
      i. longitudinally extending beam means adapted to fit in a sliding relationship within said tubular frame means of said carriage member,
      ii. trailer hitch means mounted at one end of said beam means,
   c. said carriage member being slidable relative to said towing frame means between a first position disposed substantially centrally of the length of said longitudinally extending tubular frame means for towing such that the towing frame means extends both forwardly and rearwardly of the carriage member for a distance at least equal to the longitudinal length of the carriage member, and a second position at a second end of said towing frame means for loading and unloading a boat, and
   d. means for retaining said towing frame means relative to said carriage member in either said first or second position.

7. A boat trailer as claimed in claim 6 wherein said first and second positions are from ten to thirty feet removed from one another.

8. A boat trailer as claimed in claim 7 wherein said tubular frame means consists of a pair of spaced parallel tubular members and said beam means includes a pair of spaced parallel beam members each having a second end remote from said one end of the beam means.

9. A boat trailer as claimed in claim 8 including a detachable transverse brace member extending between said second ends of said beam members when in said first position.

10. A boat trailer as claimed in claim 8 wherein said second ends of said beam members are located inwardly of said tubular members when in said second position whereby the length of said trailer assembly in said second position may be substantially greater than the length of said longitudinally extending frame members.

11. A boat trailer comprising
    a. a boat supporting carriage member having road engaging wheel means mounted for rotation thereon, said carriage member having a leading and a trailing end, b. a towing frame having means at one end thereof for connecting said frame to a towing vehicle, said towing frame having longitudinally extending guide rail means, said guide rail means having a front end and a back end, said boat support carriage member being slidably mounted with respect to a guide path portion of said guide rail means which extends inwardly from the back end of said guide rail means, said guide path portion being substantially longer than said boat carriage member, d. said carriage member being slidable with respect to said guide path portion of said guide rail means for movement between a first retracted position in which said back end of said guide rail means is spaced a substantial distance rearwardly from the trailing end of said carriage member and a second position in which said carriage member is at the back end of said guide rail means.

12. A boat trailer as claimed in claim 11 wherein said wheel means includes at least two wheel sets mounted closely adjacent one another whereby said carriage is self-supporting.

13. A boat trailer as claimed in claim 11 wherein said trailing end of said carriage member is spaced a substantial distance rearwardly from said back end of said guide rail means when in said second position.

14. A boat trailer as claimed in claim 13 wherein said guide path portion of said guide rail means is at least 100 percent longer than said carriage member.

15. A boat trailer as claimed in claim 11 wherein said guide path portion of said carriage member is at least 50 percent longer than said carriage member.

16. A boat trailer as claimed in claim 11 wherein when said carriage member is in said first retracted position, said guide path portion of said guide rail means extends both forwardly and rearwardly of said carriage member for a distance at least equal to the longitudinal length of the carriage member.

* * * * *